United States Patent
Moebus

(10) Patent No.: US 9,248,821 B2
(45) Date of Patent: Feb. 2, 2016

(54) ASSISTANCE SYSTEM FOR A MOTOR VEHICLE AND METHOD FOR CONTROLLING A MOTOR VEHICLE

(71) Applicant: GM GLOBAL TECHNOLOGY OPERATIONS LLC, Detroit, MI (US)

(72) Inventor: Marco Moebus, Mainz (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 79 days.

(21) Appl. No.: 13/967,757

(22) Filed: Aug. 15, 2013

(65) Prior Publication Data

US 2014/0052357 A1    Feb. 20, 2014

(30) Foreign Application Priority Data

Aug. 16, 2012   (DE) .......................... 10 2012 016 240

(51) Int. Cl.
*G06F 7/00*    (2006.01)
*B60W 10/18*   (2012.01)
*B60W 40/09*   (2012.01)
*B60W 50/00*   (2006.01)
(Continued)

(52) U.S. Cl.
CPC .............. *B60W 10/18* (2013.01); *B60W 10/06* (2013.01); *B60W 30/146* (2013.01); *B60W 30/18145* (2013.01); *B60W 40/09* (2013.01); *B60W 50/0097* (2013.01); *B60W 50/082* (2013.01); *B60W 50/14* (2013.01); *B60W 30/02* (2013.01); *B60W 2550/146* (2013.01); *B60W 2550/402* (2013.01)

(58) Field of Classification Search
CPC . B60W 40/072; B60W 40/09; B60W 30/188; B60W 30/18145; B60W 30/02; B60W 10/18; B60W 50/0097; B60W 50/14; B60W 10/06
USPC ........... 701/70, 36, 37, 38, 65, 409, 439, 516; 340/438
See application file for complete search history.

(56) References Cited

U.S. PATENT DOCUMENTS 7,774,121 B2    8/2010  Lee et al.
8,344,864 B1 *  1/2013  Al-Mutawa ........... B60W 50/12
                                                       340/435
(Continued)

FOREIGN PATENT DOCUMENTS

DE    102009021959 A1     11/2010
DE    102009049592 A1 *    4/2011 ............ B60W 10/06

OTHER PUBLICATIONS

Machine translation of Freyer et al. (DE102009049592) (2011).*
German Patent Office, German Search Report for Application No. 102012016240.5, dated May 15, 2013.

*Primary Examiner* — Adam Tissot
(74) *Attorney, Agent, or Firm* — Ingrassia Fisher & Lorenz PC

(57) ABSTRACT

An assistance system is provided for a motor vehicle that includes, but is not limited to an activation device, which switches the assistance system over into a beginner mode, a capturing device, which determines a curve radius located ahead of a road travelled by the motor vehicle, and a processing device, which from the curve radius located ahead and a speed of the motor vehicle in the beginner mode generates a signal in the case the speed of the motor vehicle when travelling through the curve radius located ahead exceeds a predetermined maximum lateral acceleration. A method is also provided for controlling a motor vehicle.

20 Claims, 3 Drawing Sheets

(51) Int. Cl.
*B60W 50/08* (2012.01)
*B60W 50/14* (2012.01)
*B60W 10/06* (2006.01)
*B60W 30/14* (2006.01)
*B60W 30/18* (2012.01)
*B60W 30/02* (2012.01)

(56) References Cited

U.S. PATENT DOCUMENTS

2008/0059037 A1* 3/2008 Isaji .................... B60W 40/072
 701/93
2009/0037062 A1* 2/2009 Lee .................... B60W 30/045
 701/70

* cited by examiner

ASSISTANCE SYSTEM FOR A MOTOR VEHICLE AND METHOD FOR CONTROLLING A MOTOR VEHICLE

CROSS-REFERENCE TO RELATED APPLICATION

This application claims priority to Patent Application No. 10 2012 016 240.5, filed Aug. 16, 2012, which is incorporated herein by reference in its entirety.

TECHNICAL FIELD

The technical field relates to an assistance system for a motor vehicle and a method for controlling a motor vehicle.

BACKGROUND

Assistance systems are increasingly employed in motor vehicles in order to influence the driving behavior of a motor vehicle through active intervention for example in steering or brake systems. Lane keeping systems for motor vehicles are known from the general prior art, through that a driving behavior, in particular a steering behavior of a motor vehicle can be actively influenced. Such systems comprise facilities for the optical road shoulder detection, which is carried out for example on the basis of one or a plurality of cameras. By doing so, an additional steering angle can be superimposed on the steering angle which is set via the steering wheel of the driver, so that dependent on the respective situation an active intervention in the driving behavior can take place.

From DE 102 008 035 115 A1 a system and a method for detecting a road curve is known, while a vehicle approaches the curve, for automatically supplying information regarding the road curvature and for controlling the vehicle speed is known. The system uses a position finding device and a map database in order to know the position of the vehicle. As a function of the speed of the vehicle, the system generates a curvature profile for different curvature data points at the or about the curve in front of the vehicle. A set speed profile and the actual vehicle speed are compared at each profile point in order to determine if the vehicle travels too fast for the target speed.

At least one object is to improve the driving safety on the basis of an assistance system in a motor vehicle. In addition, other objects, desirable features and characteristics will become apparent from the subsequent summary and detailed description, and the appended claims, taken in conjunction with the accompanying drawings and this background.

SUMMARY

Accordingly, an assistance system for a motor vehicle is created, comprising an activation device, which switches the assistance system over into a beginner's mode, a capturing device, which determines a curve radius located ahead of a road travelled by the motor vehicle, and a processing device, which from the curve radius located ahead and a speed of the vehicle in a beginners mode generates a signal, in the event that the speed of the motor on travelling through the curve radius located ahead exceeds a predetermined maximum lateral acceleration.

According to an embodiment, a so-called beginner's mode is activated, in which a predetermined speed-dependent lateral acceleration of the motor vehicle is not to be exceeded. In the case of a driver beginner, this reduces the vehicle being operated in a range that can only be controlled with difficulty, in particular with only little experience as a driver. Consequently, the assistance system makes a contribution to more driving safety and a reduction of the accident risk.

In an embodiment, the processing device additionally generates the signal in the event that a longitudinal acceleration of the motor vehicle in the beginner mode exceeds a predetermined maximum longitudinal acceleration. Accordingly, the assistance system monitors not only lateral accelerations but also longitudinal acceleration processes, which frequently can be caused by an inexperienced driver through unintentionally strong acceleration.

In a further embodiment, the signal is connected to a warning device in order to warn a driver of the motor vehicle, with a deceleration device, preferentially a brake assistance system, in order to brake the vehicle to the maximum lateral acceleration for the curve radius ahead, or to an engine control in order to keep the motor vehicle below the maximum longitudinal acceleration. Accordingly, the driver in a first possibility is informed through a warning signal of accelerations, which are to be expected or have already occurred because of travelling too fast in a curve. The driver can now suitably react to the warning signal and brake the vehicle. In a second possibility, the assistance system directly intervenes and brakes the vehicle or reduces the engine power. Both possibilities can obviously be realized also together. The direct intervention preferentially takes place after a short waiting time in which the driver is given the opportunity to correctively intervene himself Thus, the driver first receives a visual, acoustic or haptic warning to which he does not react, followed by a short slight brake application even before the curve.

In a further embodiment, the beginner's mode can be activated on the basis of a driver experience, a driving skill, an explicit change in a vehicle mode, which preferentially corresponds to defensive driving, or an age of the driver, preferentially on the basis of an authentication through a third person. The experience, driving skill but also the age of the driver are factors which seen statistically influence the accident risk. Consequently, the beginner's mode can be activated on the basis of these criteria. Thus it is possible for example to activate the beginner mode for adolescent drivers. This should be done by an authenticated person, usually the vehicle owner, which for example can be carried out by entering a code, supplying a chip card or in a similar way.

In a further embodiment, the capturing device comprises an interface to senders arranged at the roadside, a digitized road map together with a position finding device, a laser scanner or a camera. The curve radius ahead can take place with a plurality of possibilities. Thus, it is provided to equip the processing device with an interface to senders arranged at the roadside. These can be so-called roadside components or infrastructure components in the form of intelligent traffic signs, which via radio nodes can establish a communication to the motor vehicle. Technically, this is also known by the name of Car-to-Infrastructure communication (C2I, vehicle to infrastructure communication) as wireless communication of the vehicles with intelligent traffic signs, which among other things can send out information regarding curve radii ahead.

A further includes, but is not limited to include determining a position, for example, on the basis of a GPS receiver and link this information to digital maps. From the map information, the curve radius can then be determined. It is likewise provided with the laser scanner or the camera to capture the portion of the road ahead. Independently of the realized embodiment of the capturing device it can be provided to take into account further parameters such as, for example, a road inclination or a road condition (e.g., wet, snow, road covering or similar) when determining the maximum lateral acceleration. In addition, the system can be parameterized subject to utilizing a temperature sensor or switched off.

In a further embodiment, a method for controlling a motor vehicle is created, in which the following steps are carried out: activating a beginner's mode, capturing a curve radius ahead of a road travelled by the motor vehicle, determining a maximum lateral acceleration, and generating a signal if the speed of the motor vehicle on travelling through the curve radius ahead exceeds the maximum lateral acceleration.

In an embodiment of the method, the processing device additionally generates the signal, in the case that in the beginner mode a longitudinal acceleration of the motor vehicle exceeds a predetermined maximum longitudinal acceleration. In a further embodiment of the method, the signal is connected to a warning device in order to warn a driver of the motor vehicle, with a deceleration device, more preferentially a brake assistance system, in order to brake the motor vehicle to the maximum speed for the curve radius ahead, or to an engine control in order to hold the vehicle below the maximum longitudinal acceleration or to restrict the same.

In a further embodiment of the method, the system is activated on the basis of a driver experience, a driving skill, an explicit change in a vehicle mode, which preferentially corresponds to defensive driving, or an age of the driver, preferentially on the basis of an authentication through a third person. In a further embodiment of the method, the capturing device comprises an interface to senders arranged on a roadside, a digitized road map, a position finding device or a camera.

The described method for an assistance system and the advantageous configurations can be provided in a motor vehicle, in particular in a control unit. Practically, the control unit comprises a storage device with a computer program stored thereon. The computer program serves for carrying out the method according to the embodiments.

The control unit can have a digital microprocessor unit (CPU) that is data connected to a storage system and a bus system, a working memory (RAM) as well as a storage device. The CPU is designed to execute commands which are embodied as a program stored in a storage device, to capture input signals from the data bus and to emit output signals to the data bus. The storage system can have different storage media such as optical, magnetic, solid body and other non-volatile media, on which a corresponding computer program for carrying out the method and the advantageous configurations is stored. The program can be of such a type that it is capable of embodying or carrying out the method described here, so that the CPU can carry out the steps of such a method, thereby controlling the motor vehicle.

Suitable for carrying out a method is a computer program, which comprises program code in order to carry out all steps of any of the claims when the program is executed on a computer. Here, the computer program can comprise program code in order to carry out all steps of the method. The computer program can be read into and used in already existing control units with a simple device in order to control the assistance system.

Provided for this is a computer program product with program code that are stored on a computer-readable data carrier in order to carry out the method when the program product is executed on a computer. The computer program can also be integrated in control units as a retrofit option.

A further embodiment relates to an apparatus for controlling a motor vehicle, comprising: means for activating a beginner's mode, a capturing device for capturing a curve radius of a road ahead travelled by the motor vehicle, a determining device for determining a maximum lateral acceleration, and a generating device for generating a signal in the case that the speed of the motor vehicle when travelling through the curve radius ahead exceeds the maximum lateral acceleration.

In an embodiment of the apparatus, the processing device additionally generates the signal in the case a longitudinal acceleration of the motor vehicle exceeds a predetermined maximum longitudinal acceleration in the beginner's mode. In a further configuration of the apparatus, the signal is connected to a warning device in order to warn a driver of the motor vehicle, in which the signal is connected with a deceleration device, preferentially a brake assistance system in order to brake the motor vehicle to the maximum speed for the curve radius ahead or to an engine control in order to keep the motor vehicle below the maximum longitudinal acceleration or to restrict the same.

In a further embodiment of the apparatus is activated on the basis of a driver experience, a driving skill, an explicit change in a vehicle mode, which preferentially corresponds to defensive driving, or an age of a vehicle, preferentially on the basis of an authentication through a third person. In a further embodiment of the apparatus, the capturing vice comprise an interface to senders arranged by the roadside, a digitized road map, a position finding device or a camera.

Furthermore, a motor vehicle with a control unit for an assistance system is stated, where the control unit comprises a storage device with a computer program stored thereon. The computer program is equipped for carrying out the method described above.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to application and uses. Furthermore, there is no intention to be bound by any theory presented in the preceding background or summary or the following detailed description.

Figure 1:
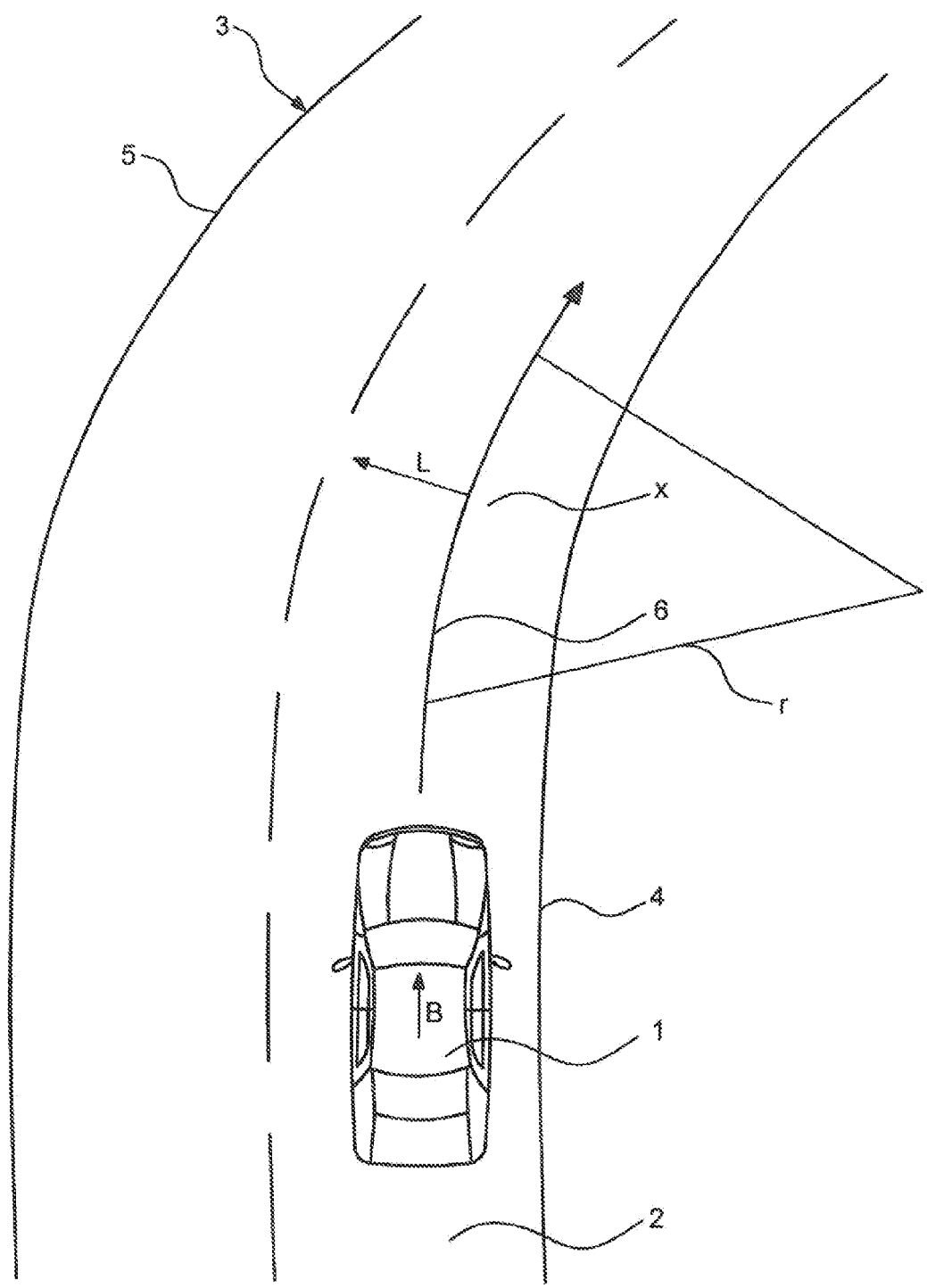
FIG. 1 is a schematic representation of a road curve of a motor vehicle ahead of a curve.

FIG. 1 shows a motor vehicle 1, which travels on a road 2. The road 2 has the shape of a curve 3 with a road boundary 4 located inside and a road boundary 5 located outside and the road 2 can be assigned a curve radius r. The motor vehicle 1 can pass through the road 1 of a trajectory. In an assistance system for the motor vehicle 1, a beginner mode is provided in which the speed of the motor vehicle 1 when travelling through the curve radius r ahead is limited so that a predetermined maximum lateral acceleration is not exceeded if possible. The beginner mode can be activated on the basis of a driver experience, a driving skill or an age of a driver, for example, on the basis of an authentication through a third person. When passing through the trajectory 6, a lateral acceleration L occurs for example at the curve entrance at the location x, which is dependent on the curve radius r, an inclination of the road 2 at the location x and the speed of the motor vehicle 1.

Figure 2:
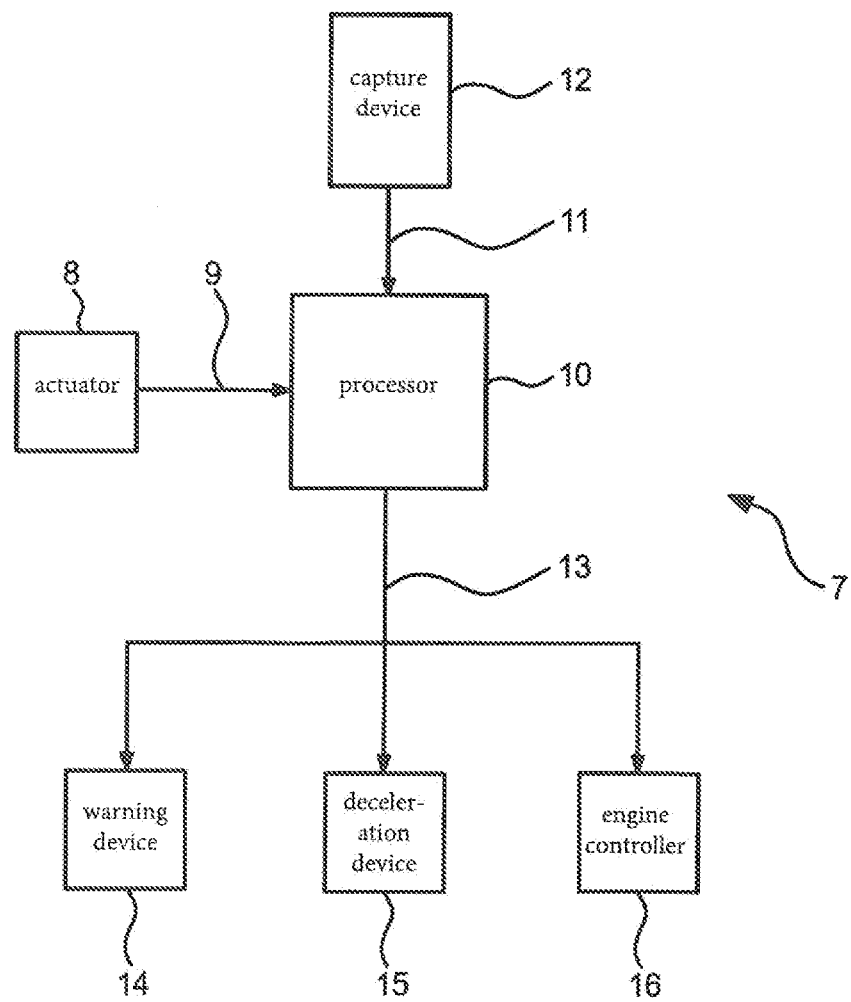
FIG. 2 is a schematic representation of the assistance system according to an embodiment.
Figure 3:
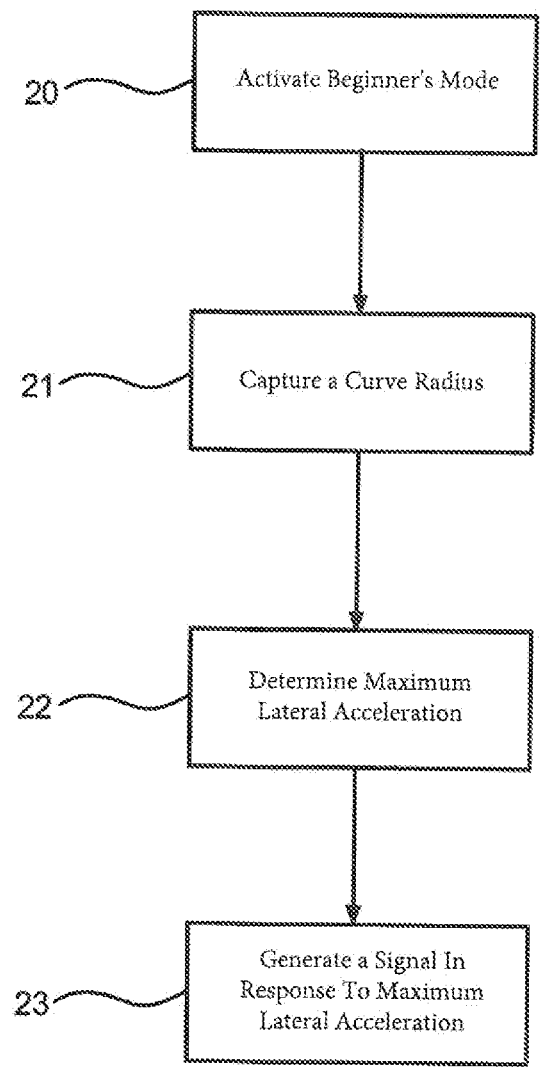
FIG. 3 is a method according to an embodiment in a flow diagram.

As shown in FIG. 2, the assistance system 7 to this end comprises an activation means 8, which via a first connection 9 signals to a processing means 10 the activation of the beginner's mode. The processing device 10 is coupled to a capturing means 12 via a second connection 11, which determines the curve radius r located ahead of the road 2 travelled by the motor vehicle 1. The processing device 10 in the beginner mode generates a signal from the curve radius r located ahead and the speed of the motor vehicle 1 in the beginner mode on the third connection 13, if the speed of the motor vehicle 1 on passing through the curve radius r located ahead exceeds a predetermined maximum natural acceleration. Likewise, the processing device 10 can generate the signal in the event a longitudinal acceleration b of the motor vehicle in the beginner mode exceeds a predetermined maximum longitudinal acceleration.

Via the third connection 13, the signal is passed on to a warning device 14 in order to warn a driver of the motor vehicle 1. Alternatively or at the same time, the signal can be connected to a deceleration device 15, for example, a brake assistance system in order to brake the motor vehicle 1 to the maximum lateral acceleration for the curve radius located ahead. Likewise, the signal can be connected to an engine control 16 in order to keep the motor vehicle 1 below the maximum longitudinal acceleration. Accordingly it is possible to activate the so-called beginner mode in which a predetermined longitudinal acceleration or lateral acceleration of the motor vehicle 1 is not to be exceeded. The related measures (warning via the warning device 14, braking via the deceleration device 15 or limiting the engine power via the engine control 16) in this case can be realized individually or in any combination.

In a method for controlling the motor vehicle 1, an activating of a beginner mode takes place in a step 20. In step 21, a capturing of a curve radius r located ahead of a road 2 travelled by the motor vehicle 1 takes place. In step 22, a determining of a maximum lateral acceleration takes place and in step 23 a signal is generated in the case the speed of the motor vehicle 1 when travelling through the curve radius r located ahead exceeds the maximum lateral acceleration.

Although in the preceding description some possible embodiments of were disclosed, it is to be understood that numerous further variants of embodiments through combination possibilities of all features mentioned and additionally obvious to the person skilled in the art and embodiments exist. It is to be understood furthermore that the exemplary embodiments are to be understood merely as examples, which in no way restrict the scope of protection, the applicability and the configuration. The preceding description is rather intended to show the person skilled in the art a suitable way of realizing at least one exemplary embodiment. It is to be understood that with an exemplary embodiment numerous changes with respect to function and arrangement of the elements can be carried out without leaving the scope of protection disclosed in the claims and its equivalent.

What is claimed is:

1. An assistance system for a motor vehicle selectively operable in a beginner mode, comprising:
    an activation device that is configured to switch the assistance system into the beginner mode based on driver specified data and a third party authentication;
    a capturing device that is configured to determine a curve radius located ahead of a road travelled by the motor vehicle; and
    a processing device that is configured to determine a lateral acceleration of the motor vehicle based on the curve radius and a speed of the motor vehicle travelling through the curve radius, and to generate a signal when the activation device is in the beginner mode and the lateral acceleration exceeds a predetermined maximum lateral acceleration.

2. The assistance system according to claim 1, wherein the processing device is further configured to generate the signal in case a longitudinal acceleration of the motor vehicle in the beginner mode exceeds a predetermined maximum longitudinal acceleration.

3. The assistance system according to claim 1, further comprising a warning device that is configured to receive the signal in order to provide a warning, and
    a deceleration device that is configured to receive the signal in order to decelerate the motor vehicle to the predetermined maximum lateral acceleration for the curve radius located ahead; and
    an engine control that is configured to receive the signal in order to maintain the motor vehicle below the predetermined maximum longitudinal acceleration.

4. The assistance system according to claim 1, wherein the driver specified data comprises a driver experience.

5. The assistance system according to claim 1, wherein the capturing device comprises an interface to senders arranged by a roadside.

6. A method for controlling a motor vehicle having an assistance system selectively operable in a beginner mode, comprising:
    activating the beginner mode of the assistance system based on driver specified data and a third party authentication;
    capturing with a capturing device a curve radius located ahead of a road travelled by the motor vehicle;
    determining a lateral acceleration based on the curve radius and a speed of the motor vehicle travelling through the curve radius; and
    generating a signal when the activation device is in the beginner mode and the lateral acceleration exceeds a predetermined maximum lateral acceleration.

7. The method according to claim 6, further comprising generating the signal in case a longitudinal acceleration of the motor vehicle in the beginner mode exceeds a predetermined maximum longitudinal acceleration.

8. The method according to claim 6, further comprising:
    generating a warning with a warning device; and
    decelerating the vehicle with a deceleration device in order to decelerate the motor vehicle to a maximum speed for the curve radius located ahead.

9. The method according to claim 6, wherein the activating the beginner mode comprises activating on a basis of a driver experience.

10. The method according to claim 6, wherein the capturing device is a digitized road map with a position finding device.

11. A non-transitory computer readable medium embodying a computer program product, said computer program product comprising a control program for controlling a motor vehicle having an assistance system selectively operable in operable a beginner mode, the control program configured to:
    activate the beginner mode based on driver specified data and the third party authentification;
    capture a curve radius received from a capturing device that is located ahead of a road travelled by the motor vehicle;

determine a lateral acceleration based on the curve radius and a speed of the motor vehicle travelling through the curve radius; and generate a signal when the activation device is in the beginner mode and the lateral acceleration exceeds a predetermined maximum lateral acceleration.

12. The non-transitory computer readable medium embodying the computer program product according to claim 11, the control program further configured to generate the signal in case a longitudinal acceleration of the motor vehicle in the beginner mode exceeds a predetermined maximum longitudinal acceleration.

13. The non-transitory computer readable medium embodying the computer program product according to claim 11, the control program further configured to:
   generate a warning with a warning device; and
   decelerate the vehicle with a deceleration device in order to decelerate the motor vehicle to a maximum speed for the curve radius located ahead.

14. The non-transitory computer readable medium embodying the computer program product according to claim 11, wherein the control program is configured to activate the beginner mode on a basis of a driver experience.

15. The non-transitory computer readable medium embodying the computer program product according to claim 11, wherein the capturing device is a digitized road map with a position finding device.

16. The assistance system according to claim 1, wherein the driver specified data comprises a driving skill.

17. The assistance system according to claim 1 wherein the driver specified data comprises an explicit change in a vehicle mode.

18. The assistance system according to claim 3, wherein the deceleration device is a brake assistance system.

19. The assistance system according to Claim 1 wherein the third party authentication comprises an authentication code issued to the activation device.

20. The assistance system according to Claim 19 wherein the third party authentication code is issued from a chip card.

\* \* \* \* \*